April 29, 1941.　　　　L. V. FRANCE　　　　2,239,708
ARTIFICIAL HONEYCOMB
Filed Dec. 27, 1938　　　　2 Sheets-Sheet 1
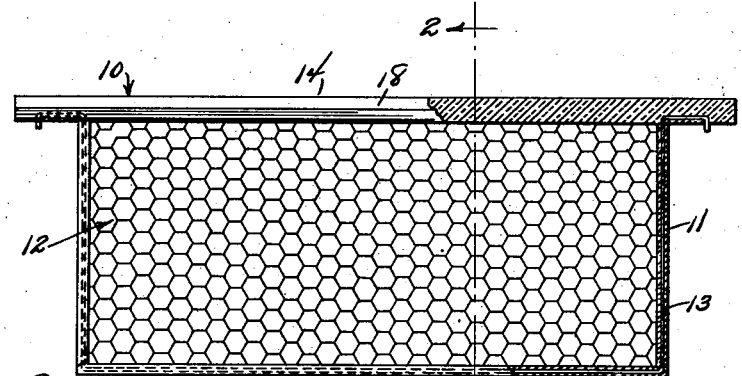
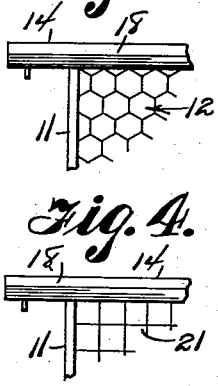
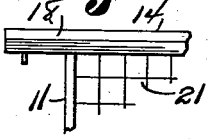
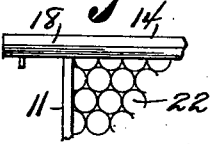
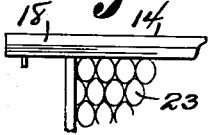
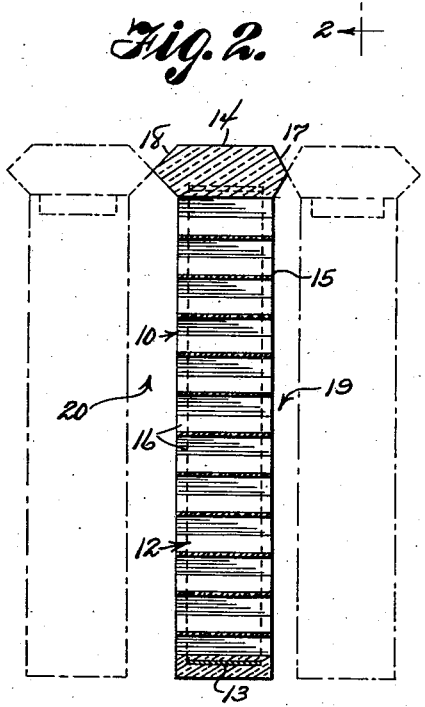
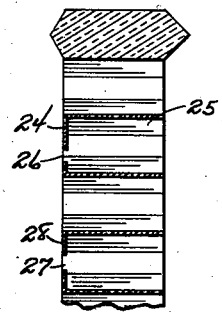
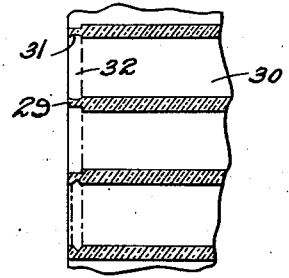
Lloyd V. France
INVENTOR
BY Victor J. Evans & Co.
ATTORNEYS April 29, 1941.  L. V. FRANCE  2,239,708
ARTIFICIAL HONEYCOMB
Filed Dec. 27, 1938  2 Sheets-Sheet 2
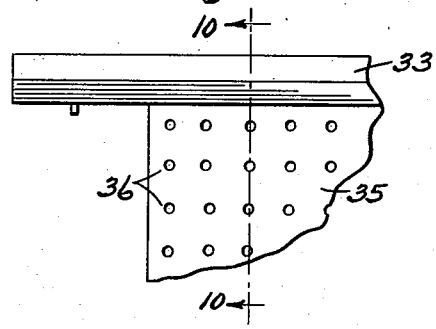
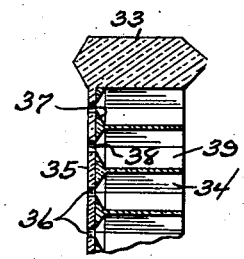
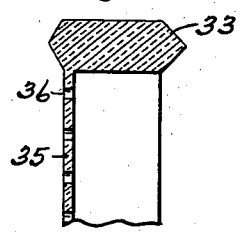
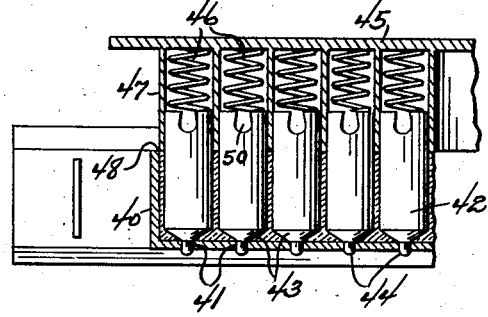
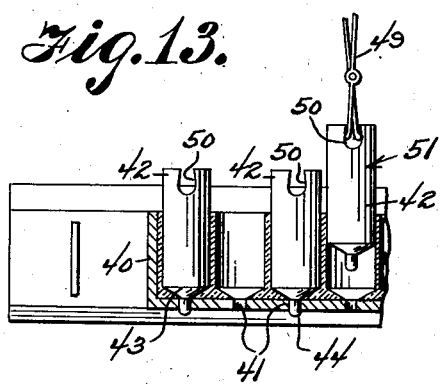
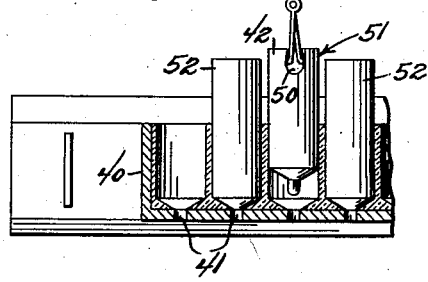
Lloyd V. France
INVENTOR
BY Victor J. Evans & Co.
ATTORNEYS Patented Apr. 29, 1941

2,239,708

UNITED STATES PATENT OFFICE 2,239,708

ARTIFICIAL HONEYCOMB

Lloyd V. France, St. Paul, Minn.

Application December 27, 1938, Serial No. 247,873

13 Claims. (Cl. 6—11)

The present invention relates to artificial honeycombs of the type in which two or more combs are arranged in abutting relation to form a composite beehive.

The herein described and illustrated honeycombs are approximately one-half the construction of natural honeycombs, whether made an integral part of the frame or separate and attached thereto.

The primary object of the invention is to provide a honeycomb preferably formed of a plastic material molded or otherwise constructed in integral formation comprising a frame of a desired shape and size, having supported therein a cellular structure comprising a series of open tubes that are circular, hexagonal or other desired shape.

Another object of the invention is to provide a honeycomb in which the frame thereof embodies means for suitably spacing the same from an adjacent honeycomb when two or more of the devices are arranged in abutting relation with the walls of the cells in a horizontal position.

A still further object of the invention is to provide an artificial honeycomb for the assembling of a beehive that is adapted to be used indefinitely without exhibiting signs of wear and one which can be easily and cheaply cleaned and disinfected without destruction of the comb.

Another object of the invention is to provide an artificial honeycomb constructed in a manner to permit the contents thereof to be removed quickly and with less handling than natural formed honeycombs without disrupting the structure of the comb thereby permitting it to be re-used for an indefinite period of time.

Another object of the invention is to provide an artificial honeycomb which may be electrically heated by any suitable means associated with the frame or the cellular structure. Bee culture operations could thus be controlled so that brood rearing and honey storage could be stimulated or retarded due to the control of the artificial heat supply within the comb structure.

The invention will be fully and comprehensively understood from a consideration of the following detailed description when read in connection with the accompanying drawings which form a part of the application.

In the drawings:

Figure 1 is a side elevational view with parts thereof in section illustrating an artificial honeycomb constructed in accordance with the present invention;

Figure 2 is a vertical sectional view taken substantially on line 2—2 of Figure 1;

Figure 3 is a fragmentary elevational view of the honeycomb illustrated in Figure 1 with the hexagonal tubes forming the cellular structure thereof arranged in a different manner;

Figure 4 is a fragmentary elevational view of a honeycomb employing substantially square shaped tubes for the formation of the cells;

Figure 5 is a fragmentary elevational view of a honeycomb embodying the use of substantially circular shaped tubes for formation of the cells;

Figure 6 is a fragmentary elevational view of a honeycomb embodying the use of substantially oval shaped tubes for formation of the cells;

Figure 7 is a sectional view illustrating a modified form of base for the cell structure;

Figure 8 is a fragmentary sectional view of a still further modified form of the invention;

Figure 9 is a fragmentary front elevational view of a modified form of honeycomb in which the cell structure is separate from the frame;

Figure 10 is a sectional view taken on line 10—10 of Figure 9;

Figure 11 is a sectional view similar to Figure 10 with the cell structure removed;

Figure 12 is a sectional view illustrating one step in the method of forming the cell structure; and Figures 13 and 14 are sectional views illustrating successive steps for completing the method of forming the cell structure.

Referring to the drawings for a more detailed description thereof and particularly Figure 1, the artificial honeycomb indicated generally by the reference numeral 10 comprises a substantially rectangular shaped frame 11 and a multiplicity of cells 12 formed of tubes transversely arranged in the frame. It is preferred to construct the frame and cell structure of a plastic material molded or otherwise constructed in one continuous article comprising the frame and multiplicity of cells. It is to be understood, however, that the device may be formed of any desired material, for example, metal in which case the cells could be electro-plated or otherwise plated with copper, brass, nickel, chromium, silver or other suitable platable metals, or such plating could be applied directly to the plastic material used.

As afore-mentioned, it is preferred to construct the honeycomb of a plastic material and during the formation thereof an electric heating element 13 is embedded in the frame for heating the frame and cell structure when desired. The heating element is, of course, adapted to be attached to any desired source of power.

The ends of the top member 14 of the frame 11 preferably extend beyond the side walls of the frame for convenience in handling, as well as support for the frame and the free ends of the heating element may project therefrom as clearly shown in Figure 1 of the drawings.

When arranging two or more of the units such as illustrated in the Figure 2 of the drawings, within a beehive, it is preferred to have them disposed in spaced relation with parts thereof in contact. It is generally customary to arrange the units with the base of the cells in close proximity with the base of the adjoining comb, said base being indicated at 15 in Figure 2 of the drawings. The base ends may be artificially closed by the application of beeswax or other suitable substance and the open ends 16 of the cells are capped by the bees after the formation of honey and other cell contents therein as is well known by those skilled in the art. To assure rapid and proper spacing of the honeycombs arranged in abutting relation as shown in Figure 2 of the drawings, the side walls 17 and 18 of the top 14 are tapered so as to cross-sectionally present the form of isosceles triangles in which the distance from the apex to the base is greater in the wall 18 than in the wall 17, as clearly shown in Figure 2. Thus when two honeycombs are arranged with the base of the cells in close proximity the space 19 formed therebetween is smaller than, for example, the space 20 formed by arranging the open ends of the cells in close proximity, with the tapered edges of the top members in direct contact.

It is to be understood that the tubes forming the cell structure can be of any desired shape and in Figures 1 and 3 of the drawings the tubes are illustrated as substantially hexagonal shaped, the tubes in Figure 3 being arranged with the angle portion thereof pointing downwardly instead of the flat portion as illustrated in Figure 1. In Figure 4 the cell structure is illustrated as being formed of a plurality of substantially square shaped tubes 21 molded or otherwise formed in the frame in the manner described in connection with the form illustrated in Figure 1 of the drawings.

In Figures 5 and 6 the cell structure is illustrated as being formed of substantially circular tubes 22 and oval shaped tubes 23 respectively, the formation of which is the same as previously described.

Referring now to Figure 7 of the drawings it will be noted that the base 24 of the cell 25 is partially closed leaving a restricted opening 26 slightly off center from said base. The opening 26 is adapted to be closed by beeswax or other suitable substance and when removing the contents of the cell, hot air or steam or both, or other suitable treatment may be applied through the opening to force the honey out through the capped ends or tops of cells. The opening 27 is formed in substantially the central portion of the partially closed base 28 of the cell.

In Figure 8 of the drawings there is illustrated a modified form of the invention in which the base ends 29 of the cells 30 are notched at 31 to form a supporting surface for the beeswax 32 applied to said ends of the cells by any desired means. In this form of the invention the tubes forming the cell structure may be of any shape or size as is to be understood from the invention.

In Figures 9, 10 and 11 of the drawings, there is illustrated a modified form of the invention in which the frame indicated generally by the reference numeral 33 is formed of metal, plastic materials or the like and the cell structure 34 is formed of natural beeswax, modified beeswax or other substance found to be most preferred or acceptable to the strain of bees being used. It is to be understood that the herein described invention may be varied from the single piece continuous article construction above described to a construction which permits the efficient replacement of injured parts. In this modified construction, the frame is formed with a screen, grid or other suitable back made of plastic or other suitable substance. Since the cell structure is formed of beeswax or other suitable substance, complete removal of the honeycomb is made possible and a new honeycomb substituted therefor, thus assuring a clean, disease free comb each time of using resulting in larger amounts of better quality honey and greater efficiency in brood rearing than when naturally formed honeycombs are repeatedly used.

The screen or grid back 35 is formed with a multiplicity of openings 36 and, when assembling the honeycomb, the base 37 of the cell structure rests against the back 35. During the formation of the cell structure, openings 38 are formed in the base 37 which correspond to and align with the openings 36 of the back 35. As is well known, the open ends 39 of the cells 34 are capped by the bees and in the removal of honey from this type of honeycomb the entire cell structure is removed in the following manner. The capped cell side of the honeycomb is placed downwardly on a sharp edged grid or screen surface, which surface may be heated by suitable means. Hot air, steam or other suitable treatment is forced through the openings 36, the pressure of which in conjunction with the heated grid or screen surface weakens the capped end so that the entire comb and its contents can be removed. After removal of the comb and its contents the empty frame illustrated in Figure 11 of the drawings is cleaned and sterilized and otherwise made ready for reuse.

The removable cell structure 34 is formed by a novel method, the several steps of which are illustrated in Figures 12, 13 and 14 of the drawings. A suitable container 40 having a series of spaced openings 41 therein is filled to a desired depth with liquid, semi-liquid or other desired conditioned and tempered beeswax or other suitable substance which is to be formed into the honeycomb of desired cell depth. Into this substance is lowered a plurality of cylinders 42 which serve as molds for the formation of the cells. The cylinders or molds 42 are hexagonal or other shape depending upon the type of cell desired to be formed, and the lower ends 43 are shaped similar to the bases of naturally formed honeycomb cells. The ends 43 are provided with pointed projections 44 adapted to be received within the openings 41 of the container 40 during placement of the molds. A plate or other suitable device 45 has attached thereto a multiplicity of spaced coiled springs 46 adapted to contact the upper end of the molds 42 to exert pressure thereon for holding said molds within the substance contained within the container 40. The sleeves 47 also carried by the plate 45 encircle the molds 42 and are adapted to space said molds in relation to each other with the assistance of the projections 44 and openings 41. With the spacing sleeves 47 encircling the entire group of cell molds 42 the unit is moved downwardly by exerting pressure on the plate 45 until said sleeves have reached the desired top edge or correct height of the cell structure which is indicated at 48 in the drawings. With the unit held in this position the substance is permitted to cool whereupon the spacing sleeves 47, plate 45 and springs 46 are removed.

Figures 13 and 14 of the drawings illustrate the container and molds with the pressure unit removed and the next step is to remove the molds without disrupting the cell structure. For accomplishing this purpose, there is provided a series of expansible fingers 49 adapted to engage specially formed openings 50 in the top end of the molds 42. Alternate rows of the cell molds are first removed by actuating the expansible fingers by appropriate means. One of the molds being removed is indicated at 51 in Figures 13 and 14 of the drawings. It has been found that the side walls of the cell structure of the removed molds will not collapse due to air being admitted through the openings 41. During the removal of the other alternate rows of molds, dummy molds 52 slightly smaller in diameter than the formed cells are positioned within the cells formerly occupied by the molds 42. The dummy molds 52 will effectively hold the cell structure while removing the other molds 42 and with the removal of the dummy molds the cell structure is complete and consists of a series of cell walls united with a base having perforations or openings therein to permit the entrance of air which, as afore-indicated, prevents the collapse of the cell structure upon removal of the cell forming device.

It is to be understood, of course, that any size or shape or depth of cell, cell side wall thickness or other cell wall variation may be formed and attached integrally to a base of desired thickness and having any desired surface features on one or both sides of said base as well as desired variations in the perforations of said base.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed as new is:

1. A honeycomb comprising a substantially rectangular shaped frame, said frame provided with a multiplicity of integrally formed transversely arranged cells, and means on said frame for variably spacing the same when a similar unit is positioned on each side thereof.

2. A honeycomb comprising a substantially rectangular shaped frame, said frame provided with a multiplicity of integrally formed transversely arranged cells, means on said frame for spacing the same when a similar structure is positioned adjacent thereto, and means carried by said frame for heating said cells.

3. A honeycomb comprising a substantially rectangular shaped frame, said frame provided with a multiplicity of integrally formed substantially hexagonal shaped cells and means on said frame for variably spacing the same when a similar unit is positioned on each side thereof.

4. A honeycomb comprising a substantially rectangular shaped frame, said frame provided with a multiplicity of integrally formed substantially square shaped cells, and means on said frame for variably spacing the same when a similar structure is positioned on each side thereof.

5. A honeycomb comprising a substantially rectangular shaped frame, said frame provided with a multiplicity of substantially cylindrical shaped cells transversely arranged in said frame, and means on said frame for variably spacing the same when a similar structure is positioned on each side thereof.

6. An artificial honeycomb comprising a substantially rectangular-shaped frame, a multiplicity of integrally formed transversely arranged cells supported within said frame, the top bar of said frame projecting beyond each end wall thereof, and means integral with said top bar whereby to variably space said frame when like frames are disposed on each side thereof.

7. An artificial honeycomb comprising a substantially rectangular-shaped frame, a multiplicity of integrally formed transversely arranged cells supported within said frame, the top bar of said frame projecting beyond each end wall thereof, the side edges of said top bar extending at different angles with respect to the end faces of the transversely arranged cells to variably space like frames disposed in abutting relation on each side thereof.

8. An artificial honeycomb comprising a substantially rectangular-shaped frame including top, bottom and end walls, said top wall projecting beyond each end wall, a multiplicity of integrally formed transversely arranged cells supported within said frame, and electrical means within said end and bottom walls and terminating in the projecting ends of said top wall for heating said cells.

9. An artificial honeycomb comprising a substantially rectangular-shaped frame including top, bottom and end walls, said top wall projecting beyond each end wall, a multiplicity of integrally formed transversely arranged cells supported within said frame, electrical means within said end and bottom walls and terminating in the projecting ends of said top wall for heating said cells, and means integral with said top wall whereby to variably space said frame when like frames are disposed on each side thereof.

10. A honeycomb comprising a substantially rectangular shaped frame, said frame provided with a multiplicity of integrally formed transversely arranged cells, said cells being plated with suitable platable materials, and means on said frame for variably spacing the same when a similar unit is positioned on each side thereof.

11. A honeycomb comprising a substantially rectangular shaped frame, said frame provided with a multiplicity of integrally formed transversely arranged cells, the opposite side edges of said frame extending at different angles with respect to the end faces of the transversely arranged cells, to variably space like frames disposed in abutting relation on each side thereof.

12. A honeycomb comprising a substantially rectangular shaped frame, said frame provided with a multiplicity of integrally formed transversely arranged plated cells, means on said frame for variably spacing the same when a similar structure is positioned adjacent thereto, and means carried by said frame for heating said plated cells.

13. A honeycomb comprising a substantially rectangular shaped frame including top, bottom and end walls, said top wall projecting beyond each end wall, said frame provided with a multiplicity of integrally formed transversely arranged cells, the opposite side edges of the top wall extending at different angles with respect to the end faces of the transversely arranged cells, to variably space like frames disposed in abutting relation on each side thereof, and means carried by said frame for heating said cells.

LLOYD V. FRANCE.